(12) United States Patent
Yang

(10) Patent No.: US 11,265,736 B2
(45) Date of Patent: Mar. 1, 2022

(54) METHOD FOR CONFIGURING ANR, TERMINAL DEVICE, BASE STATION, AND CORE NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 44 days.

(21) Appl. No.: 16/709,351

(22) Filed: Dec. 10, 2019

(65) Prior Publication Data

US 2020/0145843 A1  May 7, 2020

Related U.S. Application Data

(63) Continuation of application No. PCT/CN2018/083059, filed on Apr. 13, 2018.

(30) Foreign Application Priority Data

Sep. 13, 2017  (WO) ................ PCT/CN2017/101585

(51) Int. Cl.
*H04W 24/02* (2009.01)
*H04W 24/10* (2009.01)
*H04W 84/04* (2009.01)

(52) U.S. Cl.
CPC ............ *H04W 24/02* (2013.01); *H04W 24/10* (2013.01); *H04W 84/042* (2013.01)

(58) Field of Classification Search
CPC ....... H04W 24/10; H04W 24/02; H04W 8/00; H04W 72/04; H04W 84/042
USPC .......................................................... 370/241
See application file for complete search history.

(56) References Cited

U.S. PATENT DOCUMENTS

| 2015/0156693 | A1* | 6/2015 | Tabet ................... H04W 36/30 455/437 |
| 2015/0257051 | A1 | 9/2015 | Rao et al. |
| 2016/0165527 | A1 | 6/2016 | Radulescu et al. |
| 2016/0286424 | A1* | 9/2016 | Li ................... H04W 36/00835 |

(Continued)

FOREIGN PATENT DOCUMENTS

| CN | 101931984 | 12/2010 |
| CN | 102572769 | 7/2012 |

(Continued)

OTHER PUBLICATIONS

WIPO, ISR for PCT/CN2018/083059, dated Jul. 2, 2018.

(Continued)

*Primary Examiner* — Gbemileke J Onamuti
(74) *Attorney, Agent, or Firm* — Hodgson Russ LLP

(57) ABSTRACT

Provided are a method for configuring an ANR, a terminal device, a base station, and a core network device. The method includes: receiving measurement configuration information sent from a base station; measuring one or more attributes of a neighboring cell and a Cell Global Identifier (CGI) of the neighboring cell, according to the measurement configuration information; and sending a measurement report to the base station, wherein the measurement report is used for indicating the one or more attributes of the neighboring cell and the CGI.

16 Claims, 6 Drawing Sheets

(56) References Cited

U.S. PATENT DOCUMENTS

| | | | |
|---|---|---|---|
| 2016/0316467 | A1 | 10/2016 | Won et al. |
| 2017/0064563 | A1* | 3/2017 | Zhu ................. H04W 24/10 |
| 2017/0070896 | A1 | 3/2017 | Shindo |
| 2018/0027471 | A1* | 1/2018 | Zhang ............... H04W 24/10 455/436 |
| 2019/0059105 | A1* | 2/2019 | Harada .............. H04W 16/10 |

FOREIGN PATENT DOCUMENTS

| | | |
|---|---|---|
| CN | 102572926 | 7/2012 |
| CN | 103037456 | 4/2013 |
| CN | 105307149 | 2/2016 |
| CN | 106034316 | 10/2016 |
| CN | 106454964 | 2/2017 |
| CN | 106572477 | 4/2017 |
| RU | 2599382 | 10/2016 |
| WO | 2010017731 | 2/2010 |
| WO | 2012083701 | 6/2012 |

OTHER PUBLICATIONS

RCR Wireless News, "LTE PCI Planning for Pesky Neighbors", URL: https://www.rcrwireless.com/20140509/wireless/lte-pci-planning, May 9, 2014.
Intellectual Property Office of Singapore, First Office Action for SG11201911131P, Oct. 2, 2020.
Ericsson, "ANR framework in NR", 3GPP TSG-RAN WG2 #99, R2-1708581, Aug. 21, 2017, 4 pages, Germany.
LG Electronics Inc., "ANR for NR", 3GPP TSG-RAN2 #99, R2-1709128, Aug. 21, 2017, 2 pages, Germany.
Oppo, "Discussion on ANR Functionality for eLTE," 3GPP TSG-RAN WG2#99bis, R2-1710183, Oct. 2017, 3 pages.
Anonymous, "LTE PCT—Handling Neighboring Calls with ANR," May 2014, retrieved from the internet: <:https://www.rcrwireless.com/20140509/wireless/lte-pci-planning>, 4 pages.
EPO, Office Action for EP Application No. 18855354.9, dated Feb. 24, 2020.
Wipo, ISR for PCT/CN2017/101585, dated May 29, 2018.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, Jun. 2017, v14.3.0, 331 pages.
FSIP, Office Action for RU Application No. 2019142490/07, dated Apr. 22, 2021.
EPO, Communication for EP Application No. 18855354.9, dated Feb. 5, 2021.
IPI, Office Action for IN Application No. 201917050957, dated Apr. 15, 2021.
EPO, Summons to attend oral proceedings for EP Application No. 18855354.9, dated Aug. 11, 2021.
ISDEC, Office Action for CA Application No. 3065121, dated Nov. 29, 2021.
TIPO, Office Action for TW Application No. 107132327, dated Oct. 29, 2021.

\* cited by examiner

METHOD FOR CONFIGURING ANR, TERMINAL DEVICE, BASE STATION, AND CORE NETWORK DEVICE

CROSS-REFERENCE TO RELATED APPLICATIONS

This application is a continuation of International Application No. PCT/CN2018/083059, filed on Apr. 13, 2018, which claims priority to International Application No. PCT/CN2017/101585, filed on Sep. 13, 2017, the entire disclosures of which are incorporated herein by reference.

TECHNICAL FIELD

Implementations of the present disclosure generally relate to communication technologies, and more particularly, to methods for configuring an ANR, terminal devices, base stations and core network devices.

BACKGROUND

In the Long Term Evolution (LTE) communication systems, an Automatic Neighbor Relationship (ANR) is proposed for neighbor cell optimization. The ANR function requires participation of a network side gateway (Operation And Management, O & M) and a terminal device. The terminal device acquires the neighbor cell information by measurement, and the O & M adds information to a Neighbor Relationship Table (NRT), or updates the NRT.

In LTE systems, the terminal device mainly acquires a Cell Global Identifier (CGI). In related technologies, the neighboring cell of the cell which terminal device dwells on may be an LTE cell, an evolved LTE (eLTE) cell, or a New Radio (NR) cell, the CGI alone cannot meet the current demand for ANR function.

SUMMARY

Implementations of the present disclosure provide methods for configuring an ANR, terminal devices, base stations, and core network devices.

According to a first aspect, there is provided a method for configuring an automatic neighbor relationship (ANR), including:

receiving measurement configuration information sent from a base station;

according to the measurement configuration information, measuring one or more attributes of a neighboring cell and a neighboring cell identifier (Cell Global Identifier, CGI); and sending a measurement report to the base station, wherein the measurement report is configured to indicate the one or more attributes of the neighboring cell and the GCI.

In an implementation of the first aspect, the one or more attributes of the neighboring cell include at least one of a Core Network (CN) type of the neighboring cell, a cell type of the neighboring cell, whether the neighboring cell supports a specific service, whether the neighboring cell has an available network slice, a specific System Information Block (SIB) of the neighboring cell, and whether the neighboring cell supports an Xn interface.

In an implementation of the first aspect, if the one or more attributes of the neighboring cell include at least the CN type of the neighboring cell, the method further include:

determining the CN type of the neighboring cell according to a correspondence between CN types and at least one of Tracking Area Codes (TACs) and Cell Global Identifiers (CGIs), and at least one of a TAC and a CGI of the neighboring cell;

sending the measurement report to the base station, includes:

sending the measurement report to the base station, wherein the measurement report includes at least at least one of the TAC and the CGI of the neighboring cell and does not include the CN type of the neighboring cell, and at least one of the TAC and the CGI of the neighboring cell implicitly indicates the CN type of the neighboring cell.

In an implementation of the first aspect, the correspondence between CN types and at least one of TACs and CGIs is preset, and at least one of TAC and CGI formats corresponding to different CN types are different.

In an implementation of the first aspect, the one or more attributes of the neighboring cell include at least one of whether the neighboring cell is a licensed frequency band and whether the neighboring cell supports standalone access.

In an implementation of the first aspect, the measurement configuration information includes a first duration;

sending the measurement report to the base station, includes:

sending to the base station a first measurement report, wherein the first measurement report is configured to indicate an attribute among the one or more attributes of the neighboring cell which is measured within the first duration.

In an implementation of the first aspect, the method further includes:

sending to the base station first indication information, wherein the first indication information is configured to indicate an attribute among the one or more attributes of the neighboring cell which is not measured within the first duration.

In an implementation of the first aspect, the method further includes:

sending to the base station second indication information, wherein the second indication information is configured to notify the base station that in item information of an ANR list, the attribute among the one or more attributes of the neighboring cell which is not measured by a terminal device within the first duration is left blank;

wherein the item information includes the one or more attributes of the neighboring cell and the CGI.

In an implementation of the first aspect, the neighboring cell is at least one of a cell supporting Long Term Evolution (LTE) communication, a cell supporting evolved Long Term Evolution (eLTE) communication, and a cell supporting New Radio (NR) communication.

According to a second aspect, there is provided a method for configuring an automatic neighbor relationship (ANR), including:

sending measurement configuration information to a terminal device, wherein the measurement configuration information is configured to instruct the terminal device to measure one or more attributes of a neighboring cell and a Cell Global Identifier (CGI); and receiving a measurement report which is sent by the terminal device in response to the measurement configuration information.

In the method for configuring an ANR according to implementations of the present disclosure, the base station sends measurement configuration information to the terminal device, so as to instruct the terminal device to measure one or more attributes of a neighboring cell in addition to a Global Cellular Identifier, new attribute is added in the cell measurement procedure, and thus the demand for measuring more types of neighboring cells and the demand for ANR in 5G communications can be met.

In an implementation of the second aspect, the one or more attributes of the neighboring cell include at least one of a Core Network (CN) type of the neighboring cell, a cell type of the neighboring cell, whether the neighboring cell supports a specific service, whether the neighboring cell has an available network slice, a specific System Information Block (SIB) of the neighboring cell, and whether the neighboring cell supports an Xn interface.

In an implementation of the second aspect, if the one or more attributes of the neighboring cell include at least the CN type of the neighboring cell, receiving a measurement report which is sent by the terminal device in response to the measurement configuration information includes:

receiving the measurement report sent from the terminal device, wherein the measurement report include at least at least one of a Tracking Area Code (TAC) and a Cell Global Identifier (CGI) of the neighboring cell and does not include the CN type of the neighboring cell, and at least one of the TAC and the CGI of the neighboring cell implicitly indicates the CN type of the neighboring cell.

In an implementation of the second aspect, the one or more attributes of the neighboring cell include at least one of whether the neighboring cell is a licensed frequency band and whether the neighboring cell supports standalone access.

In an implementation of the second aspect, the measurement configuration information includes a first duration;

receiving a measurement report which is sent by the terminal device in response to the measurement configuration information, includes:

receiving a first measurement report sent from the terminal device, wherein the first measurement report is configured to indicate an attribute among the one or more attributes of the neighboring cell which is measured by the terminal device within the first duration.

In an implementation of the second aspect, the method further includes:

receiving first indication information sent from the terminal device, wherein the first indication information is configured to indicate an attribute among the one or more attributes of the neighboring cell which is not measured by the terminal device within the first duration.

In an implementation of the second aspect, the method further includes:

receiving second indication information sent from the terminal device, wherein the second indication information is configured to notify the base station that in item information of an ANR list, the attribute among the one or more attributes of the neighboring cell which is not measured by the terminal device within the first duration is left blank;

wherein the item information includes the one or more attributes of the neighboring cell and the CGI.

In an implementation of the second aspect, the method further includes:

determining an ANR list according to the measurement report sent from the terminal device, wherein the ANR list includes the one or more attributes of the neighboring cell which are measured by the terminal device and are carried in the measurement report.

In an implementation of the second aspect, before sending the measurement configuration information, the method further includes:

receiving item information sent from a core network device, wherein the item information includes the one or more attributes of the neighboring cell and the CGI; and according to the item information, generating an ANR list including the item information.

In an implementation of the second aspect, the method further includes:

generating the measurement configuration information according to the item information.

In an implementation of the second aspect, the neighboring cell is at least one of a cell supporting Long Term Evolution (LTE) communication, a cell supporting evolved Long Term Evolution (eLTE) communication, and a cell supporting New Radio (NR) communication.

According to a third aspect, there is provided a method for configuring an ANR, including:

sending item information of an ANR list to a base station, wherein the item information includes at least one of a Cell Global Identifier (CGI), a Core Network (CN) type of a neighboring cell, a cell type of the neighboring cell, whether the neighboring cell supports a specific service, whether the neighboring cell has an available network slice, a specific System Information Block (SIB) of the neighboring cell, whether the neighboring cell supports an Xn interface, whether the neighboring cell is a licensed frequency band and whether the neighboring cell supports standalone access, and the ANR list is configured to indicate one or more attributes of the neighboring cell which are measured by the terminal device according to the item information.

According to a fourth aspect, implementations of the present disclosure provide a terminal device. The terminal device includes modules or units for performing the methods according to the first aspect or any one of the exemplary implementations of the first aspect.

According to a fifth aspect, implementations of the present disclosure provide a network device. The network device includes modules or units for performing the methods according to the second aspect or any one of the exemplary implementations of the second aspect.

According to a sixth aspect, implementations of the present disclosure provide a core network device. The core network device includes modules or units for performing the method according to the third aspect.

According to a seventh aspect, there is provided a terminal device. The terminal device includes a processor, a memory, and a communication interface. The processor is coupled to the memory and communication interface. The memory is configured to store instructions, the processor is configured to execute the instructions, and the communication interface is configured to communicating with other network elements under the control of the processor. When the processor executes the instructions stored in the memory, the processor is caused to perform the methods according to the first aspect or any possible implementation of the first aspect.

According to an eighth aspect, there is provided a network device. The network device includes a processor, a memory, and a communication interface. The processor is coupled to the memory and communication interface. The memory is configured to store instructions, the processor is configured to execute the instructions, and the communication interface is configured to communicating with other network elements under the control of the processor. When the processor executes the instructions stored in the memory, the processor is caused to perform the methods according to the second aspect or any possible implementation of the second aspect.

According to a ninth aspect, there is provided a core network device. The core network device includes a processor, a memory, and a communication interface. The processor is coupled to the memory and communication interface. The memory is configured to store instructions, the processor is configured to execute the instructions, and the communication interface is configured to communicating with other network elements under the control of the processor. When the processor executes the instructions stored in the memory, the processor is caused to perform the method according to the third aspect.

According to a tenth aspect, there is provided a computer storage medium having stored therein program codes for instructing a computer to execute the instructions for performing the methods according to the first aspect or any possible implementation of the first aspect.

According to an eleventh aspect, there is provided a computer storage medium having stored therein program codes for instructing a computer to execute the instructions for performing the methods according to the second aspect or any possible implementation of the second aspect.

According to a twelfth aspect, there is provided a computer storage medium having stored therein program codes for instructing a computer to execute the instructions for performing the methods according to the third aspect.

According to a thirteenth aspect, there is provided a computer program product including instructions. When the instructions are executed on a computer, the computer is caused to perform the methods described in the above aspects.

DETAILED DESCRIPTION

The technical solutions in the implementations of the present disclosure will be clearly and completely described in the following with reference to the accompanying drawings.

The technical solutions of the implementations of the present disclosure can be applied to various communication systems, for example, a Long Term Evolution (LTE) system, an LTE Frequency Division Duplex (FDD) system, an LTE Time Division Duplex ("TDD") or a future 5G system.

Figure 1:
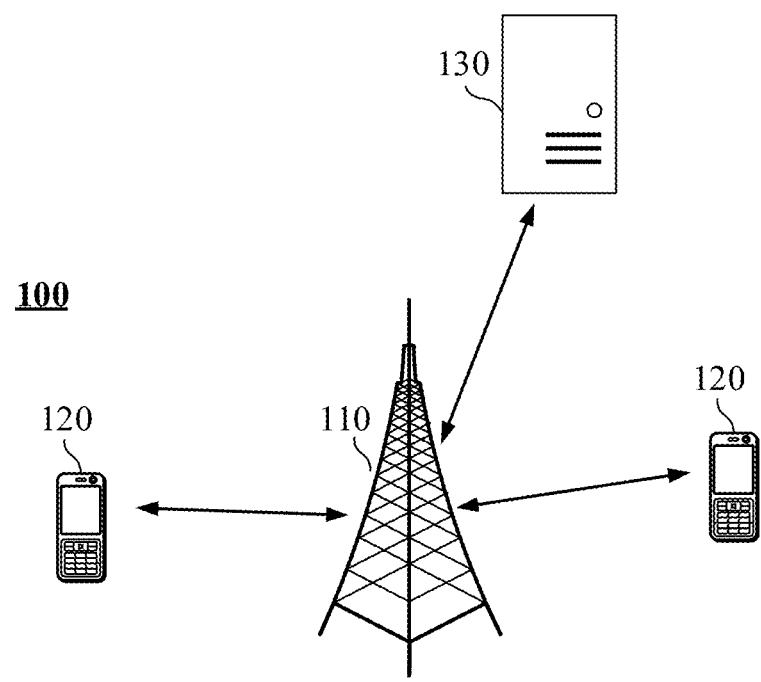
FIG. 1 shows a wireless communication system to which the implementations of the present disclosure are applied.

FIG. 1 shows a wireless communication system 100 to which implementations of the present disclosure are applied. The wireless communication system 100 can include a base station 110. The base station 110 can be a device that communicates with a terminal device. The base station 110 can provide communication coverage for a particular geographic area and can communicate with terminal devices (e.g., UEs) located within the coverage area. According to exemplary implementations, the base station 110 may be an evolved base station (evolutional Node B, eNB or eNodeB) in an LTE system, or a wireless controller in a Cloud Radio Access Network (CRAN), or the network device may be a relay station, an access point, an in-vehicle device, a wearable device, a network side device in a future 5G network, or a network device in a future evolved Public Land Mobile Network (PLMN).

The wireless communication system 100 also includes at least one terminal device 120 located within the coverage of the base station 110. Terminal device 120 can be mobile or fixed. According to exemplary implementations, the terminal device 120 may refer to an access terminal, user equipment (UE), a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, a computing device or other processing device connected to wireless modems, an in-vehicle device, a wearable device, a terminal device in future 5G networks, or a terminal device in a future evolved PLMN, and the like.

The wireless communication system 100 further includes a core network device 130 that communicates with a base station, and the core network device 130 may be a 5G core network device or an Evolved Packet Core (EPC) device.

According to exemplary implementations, the 5G system or network may also be referred to as a New Radio (NR) system or network.

FIG. 1 exemplarily shows one base station, one core network device, and two terminal devices. According to other implementations, the wireless communication system 100 may include multiple base station devices and may include other numbers of terminals within the coverage of each base station. Implementations of the present disclosure do not impose specific limitations on this.

According to exemplary implementations, the wireless communication system 100 may further include other network entities, such as a network controller, a mobility management entity, and the like.

Figure 2:
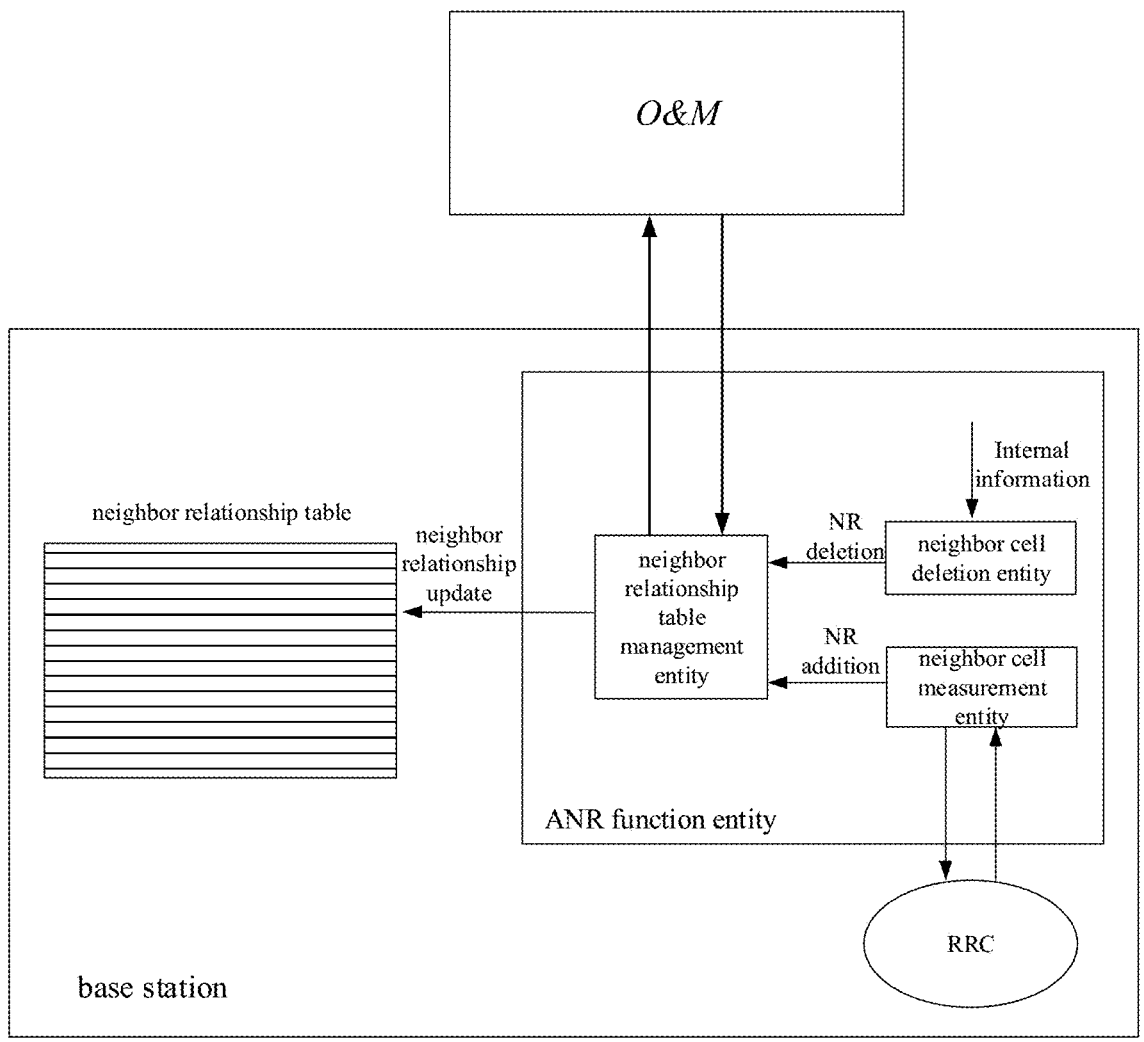
FIG. 2 is a schematic diagram showing an ANR-based interaction between a base station and a core network device in the implementations of the present disclosure.

FIG. 2 is a schematic diagram showing an ANR-based interaction between a base station and Q & M in a core network device in the implementations of the present disclosure.

The base station includes an ANR function entity, and the ANR function entity can perform information interaction with the O & M. The ANR function entity can also perform information interaction with the terminal device through Radio Resource Control (RRC).

According to exemplary implementations, the ANR functional entity may delete a neighboring cell internally, may implement neighboring cell measurement through an RRC connection, may add or update a neighbor relationship by interacting with the O & M, and may maintain an ANR list by using a neighbor relationship table management.

It should be understood that the evolved LTE (i.e., eLTE) refers to an LTE base station facility that is enhanced on the basis of LTE and can support access to a 5G core network.

It should be understood that the terms "system" and "network" are used interchangeably herein. The term "and/or" is merely an association describing the associated objects, indicating that there may be three relationships. For example, A and/or B, may indicate that A exists only, and both A and B exist, and B exists only. In addition, the character "/" generally indicates that the contextual objects are in an "or" relationship.

Figure 3:
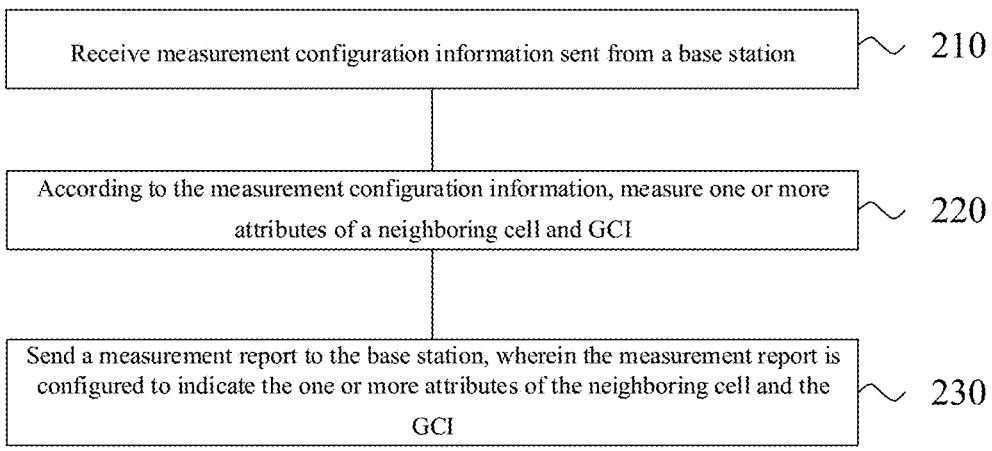
FIG. 3 is a schematic flowchart of a method for configuring an ANR according to an implementation of the present disclosure.

FIG. 3 is a schematic flowchart of a method 200 for configuring an ANR according to an implementation of the present disclosure. As shown in FIG. 3, the method 200 may be performed by a terminal device, which may be the terminal device as shown in FIG. 1. The terminal device may interact with the ANR function entity in the base station by using the RRC connection as shown in FIG. 2, so as to report a neighboring cell measurement result. The base station in the method 200 can be the base station as shown in FIG. 1. The method 200 includes the following contents.

In 210, measurement configuration information sent from the base station is received.

In 220, one or more attributes of a neighboring cell and CGI are measured according to the measurement configuration information.

According to exemplary implementations, the neighboring cell is at least one of a cell supporting LTE communication, a cell supporting eLTE communication, and a cell supporting NR communication.

It should be understood that the measurement configuration information is used to instruct the terminal device to perform neighboring cell measurement.

According to exemplary implementations, the base station may be an Evolved Node B (eNB) or a base station (gNB) in 5G communication.

According to exemplary implementations, the base station configures, in the measurement configuration information, that the terminal device measures one or more attributes of a neighboring cell and a Cell Global Identifier (CGI).

According to exemplary implementations, the one or more attributes of the neighboring cell include at least one of a Core Network (CN) type of the neighboring cell, a cell type of the neighboring cell, whether the neighboring cell supports a specific service, whether the neighboring cell has an available network slice, a specific System Information Block (SIB) of the neighboring cell, and whether the neighboring cell supports an Xn interface.

For example, the CN type may be an EPC, a 5G core network (5G Core, 5GC), or both EPC and 5GC.

For example, the cell type of the neighboring cell may be a cell supporting LTE communication, a cell supporting eLTE communication, or a cell supporting NR communication.

For example, the specific service supported by the neighboring cell may be a Vehicle to Everything (V2X) service, or a Device to Device (D2D) service or other services.

According to exemplary implementations, the terminal device may determine the CN type of the neighboring cell according to a correspondence between CN types and at least one of TACs and CGIs, and at least one of a TAC and a CGI of the neighboring cell.

It should be noted that the base station can broadcast at least one of the TAC and the CGI by means of broadcast. For example, a base station A serves a neighboring cell 1, and a base station B serves a neighboring cell 2. In this case, the base station A can transmit at least one of the TAC and the CGI of the neighboring cell 1 to the terminal device in a broadcast manner, and the base station B can transmit at least one of the TAC and CGI of the neighboring cell 2 to the terminal device in a broadcast manner. Therefore, the terminal device can acquire at least one of the TACs and CGIs of its neighboring cells.

It should also be noted that a base station can broadcast at least one TAC and CGI. If different core networks are connected, the base station can broadcast the TAC and CGI with the same or different formats for different core network types.

According to exemplary implementations, the correspondence between CN types and at least one of TACs and CGIs is preset, and at least one of TAC and CGI formats corresponding to different CN types are different.

For example, the TAC format corresponding to 5GC is 3 bytes, and the TAC format corresponding to EPC is 2 bytes.

For another example, the CGI format corresponding to the EPC is shorter than the CGI format corresponding to the 5GC.

The CGI format corresponding to the EPC being shorter than the CGI format corresponding to the 5GC can be understood as that the CGI format corresponding to the 5GC can have more bits.

For example, if the eLTE base station is connected to the EPC, the TAC of the TAC format 1 may be broadcasted, and/or the CGI of the CGI format 1 may be broadcast. If the eLTE base station is connected to the 5GC, the TAC of the TAC format 2 may be broadcast, and/or the CGI of the CGI format 2 may be broadcasted. The TAC format 1 can be 2 bytes, the TAC format 2 can be 3 bytes, the CGI format 1 is shorter than the CGI format 2. Thus, the terminal device can determine the CN type of the neighboring cell according to at least one of the TAC and CGI of the neighboring cell According to exemplary implementations, the one or more attributes of the neighboring cell include at least one of whether the neighboring cell is a licensed frequency band and whether the neighboring cell supports standalone (SA) access.

It should be noted that the neighboring cell may be a licensed frequency band or an unlicensed frequency band. The neighboring cell can support standalone (SA) access or non-standalone (NSA) access.

According to exemplary implementations, the one or more attributes of the neighboring cell include at least one of a CN type of the neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access.

In 230, a measurement report is sent to the base station. The measurement report is configured to indicate the one or more attributes of the neighboring cell and the GCI.

According to exemplary implementations, if the one or more attributes of the neighboring cell include at least the CN type of the neighboring cell, the measurement report includes at least at least one of the TAC and the CGI of the neighboring cell and does not include the CN type of the neighboring cell, and at least one of the TAC and the CGI of the neighboring cell implicitly indicates the CN type of the neighboring cell.

In other words, when the base station instructs the terminal device to measure the CN type of the neighboring cell, the terminal device may implicitly indicate the CN type of the neighboring cell by at least one of the TAC and the CGI.

According to exemplary implementations, the base station configures a trigger condition of the measurement report, and the terminal device can report the measurement report when the trigger condition of the measurement report is met, and does not wait until all the measurement results are obtained.

For example, the base station configures the time for reporting the measurement report. For example, the measurement result can be reported after 5 ms of measurement.

For another example, the base station configures information for reporting the measurement report. For example, after measuring the CGI, the CN type of the neighboring cell, and the cell type of the neighboring cell, the report measurement can be sent.

According to exemplary implementations, the base station configures a time for reporting the measurement report. Under such condition, the measurement configuration information includes a first duration.

According to exemplary implementations, the terminal device sends a first measurement report to the base station. The first measurement report is configured to indicate an attribute among the one or more attributes of the neighboring cell which is measured within the first duration.

According to exemplary implementations, the terminal device sends first indication information to the base station. The first indication information is configured to indicate an attribute among the one or more attributes of the neighboring cell which is not measured within the first duration. According to exemplary implementations, after the base station learns the attribute which is not measured by the terminal device within the first duration, the base station may continue to wait to acquire neighboring cell information obtained by the terminal device in subsequent measurements. According to other exemplary implementations, after the base station learns the attribute which is not measured by the terminal device within the first duration, the base station may not wait and directly maintain the ANR list for the terminal device.

According to exemplary implementations, the terminal device sends second indication information to the base station. The second indication information is configured to notify the base station that in item information of an ANR list, the attribute among the one or more attributes of the neighboring cell which is not measured by a terminal device within the first duration is left blank. The item information includes the one or more attributes of the neighboring cell and the CGI. According to exemplary implementations, the network device leaves the attribute that is not measured by the terminal device in the first duration blank according to the second indication information, and after the terminal device subsequently reports the information, the information may be filed to blank attribute.

In the method for configuring an ANR according to implementations of the present disclosure, the base station sends measurement configuration information to the terminal device, so as to instruct the terminal device to measure one or more attributes of a neighboring cell in addition to a Global Cellular Identifier, new attribute is added in the cell measurement procedure, and thus the demand for measuring more types of neighboring cells and the demand for ANR in 5G communications can be met.

Further, the terminal device measures at least one of a CN type of the neighboring cell, a cell type of the neighboring cell, whether the neighboring cell supports a specific service, whether the neighboring cell has an available network slice, a specific System Information Block (SIB) of the neighboring cell, whether the neighboring cell supports an Xn interface, whether the neighboring cell is a licensed frequency band and whether the neighboring cell supports standalone access, and thus the demand for ANR in the eLTE and NR communications can be met.

Figure 4:
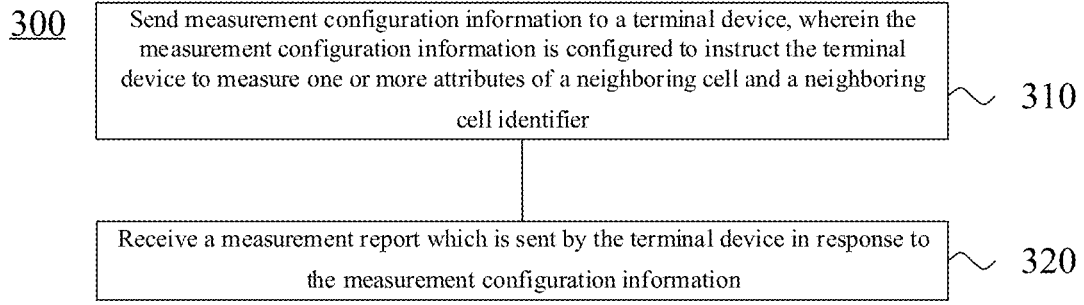
FIG. 4 is a schematic flowchart of another method for configuring an ANR according to an implementation of the present disclosure.

FIG. 4 is a schematic flowchart of a method 300 for configuring an ANR according to an implementation of the present disclosure. As shown in FIG. 4, the method 300 may be performed by a base station, which may be the base station as shown in FIG. 1. An ANR function entity in the base station may interact with an O & M in a core network device as shown in FIG. 2 to obtain the item information of the ANR list from the core network device. The terminal device and the core network device in the method 300 may be the terminal device and the core network device as shown in FIG. 1. The method 300 includes the following contents.

In 310, measurement configuration information is sent to a terminal device. The measurement configuration information is configured to instruct the terminal device to measure one or more attributes of a neighboring cell and a Global Cellular Identifier.

According to exemplary implementations, one or more attributes of the neighboring cell may be the following cases:

Case 1: the one or more attributes of the neighboring cell include at least one of a CN type of the neighboring cell, a cell type of the neighboring cell, whether the neighboring cell supports a specific service, whether the neighboring cell has an available network slice, a specific SIB of the neighboring cell, and whether the neighboring cell supports an Xn interface.

Case 2: the one or more attributes of the neighboring cell include at least one of whether the neighboring cell is a licensed frequency band and whether the neighboring cell supports standalone access.

Case 3: the one or more attributes of the neighboring cell include at least one of a CN type of the neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access.

According to exemplary implementations, the neighboring cell is at least one of a cell supporting LTE communication, a cell supporting eLTE communication, and a cell supporting NR communication.

In 320, a measurement report which is sent by the terminal device in response to the measurement configuration information is received.

According to exemplary implementations, if the one or more attributes of the neighboring cell include at least the CN type of the neighboring cell, receiving a measurement report which is sent by the terminal device in response to the measurement configuration information includes:

receiving the measurement report sent from the terminal device, wherein the measurement report include at least at least one of a TAC and a CGI of the neighboring cell and does not include the CN type of the neighboring cell, and at least one of the TAC and the CGI of the neighboring cell implicitly indicates the CN type of the neighboring cell.

According to exemplary implementations, the measurement configuration information includes a first duration.

Receiving a measurement report which is sent by the terminal device in response to the measurement configuration information in step 320, include:

receiving a first measurement report sent from the terminal device, wherein the first measurement report is configured to indicate an attribute among the one or more attributes of the neighboring cell which is measured by the terminal device within the first duration.

According to exemplary implementations, the method 300 further includes: receiving first indication information sent from the terminal device, wherein the first indication information is configured to indicate an attribute among the one or more attributes of the neighboring cell which is not measured by the terminal device within the first duration.

According to exemplary implementations, the method 300 further includes: receiving second indication information sent from the terminal device, wherein the second indication information is configured to notify the base station that in item information of an ANR list, the attribute among the one or more attributes of the neighboring cell which is not measured by the terminal device within the first duration is left blank; wherein the item information comprises the one or more attributes of the neighboring cell and the CGI.

According to exemplary implementations, the method 300 further includes: determining an ANR list according to the measurement report sent from the terminal device, wherein the ANR list comprises the one or more attributes of the neighboring cell which are measured by the terminal device and are carried in the measurement report.

According to exemplary implementations, before sending the measurement configuration information, the method 300 further comprises:

receiving item information sent from a core network device, wherein the item information comprises the one or more attributes of the neighboring cell and the CGI; and according to the item information, generating an ANR list comprising the item information.

According to exemplary implementations, the core network device configures item information for the ANR list of the terminal device as needed.

According to exemplary implementations, the method 300 further includes: generating the measurement configuration information according to the item information.

It should be understood that details regarding the steps in the method 300 for configuring the ANR can be found in the description of the corresponding steps in the method 200 for configuring the ANR, and for brevity, repeated descriptions are omitted here.

In the method for configuring an ANR according to implementations of the present disclosure, the base station sends measurement configuration information to the terminal device, so as to instruct the terminal device to measure one or more attributes of a neighboring cell in addition to a Global Cellular Identifier, new attribute is added in the cell measurement procedure, and thus the demand for measuring more types of neighboring cells and the demand for ANR in 5G communications can be met.

Further, the terminal device measures at least one of a CN type of the neighboring cell, a cell type of the neighboring cell, whether the neighboring cell supports a specific service, whether the neighboring cell has an available network slice, a specific SIB of the neighboring cell, whether the neigh-boring cell supports an Xn interface, whether the neighboring cell is a licensed frequency band and whether the neighboring cell supports standalone access, and thus the demand for ANR in the eLTE and NR communications can be met.

Figure 5:
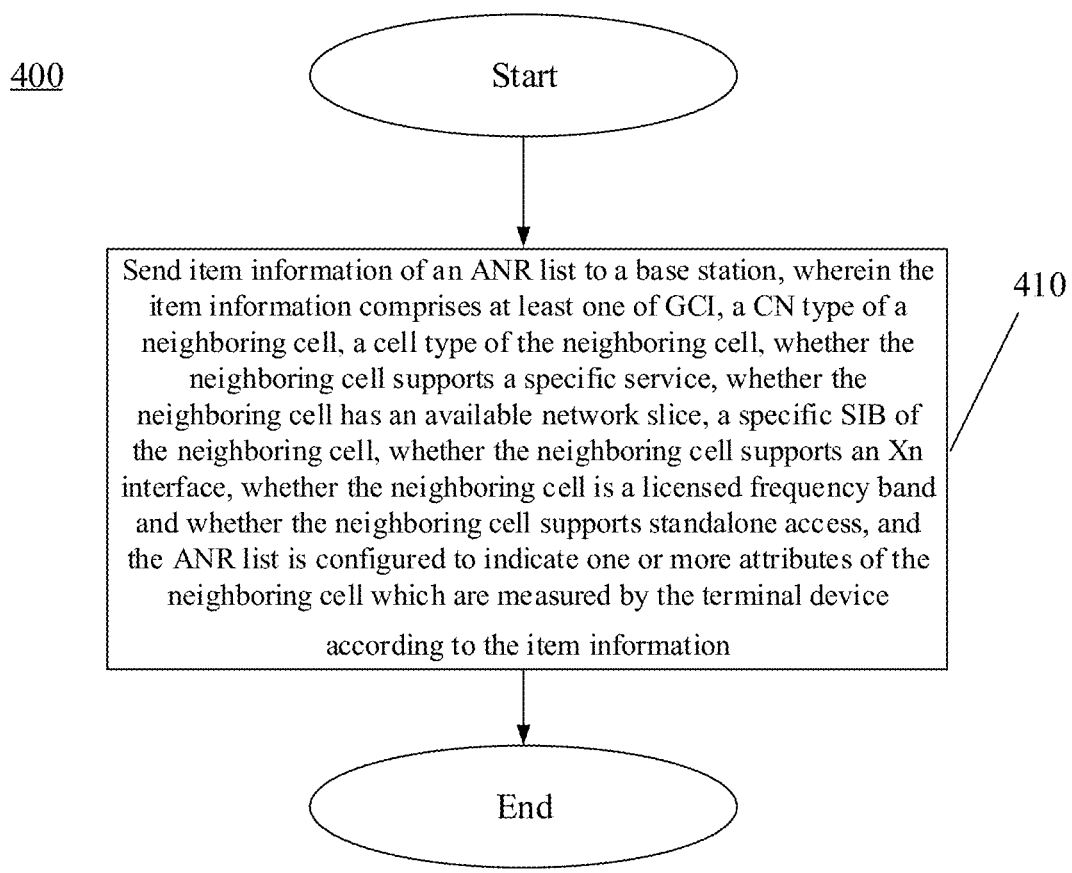
FIG. 5 is a schematic flowchart of still another method for configuring an ANR according to an implementation of the present disclosure.

FIG. 5 is a schematic flowchart of a method 400 for configuring an ANR according to an implementation of the present disclosure. As shown in FIG. 5, the method 400 may be performed by a core network device. The core network device may be a core network device as shown in FIG. 1. The O & M in the core network device may interact with an ANR function entity in the base station to send the item information of the ANR list to the base station. The base station in the method 400 may be the base station as shown in FIG. 1. The method 300 includes the following contents.

In 410, item information of an ANR list is sent to a base station. The item information comprises at least one of CGI, a Core Network (CN) type of a neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access. The ANR list is configured to indicate one or more attributes of the neighboring cell which are measured by the terminal device according to the item information.

In the method for configuring an ANR according to implementations of the present disclosure, the core network device sends item information of an ANR list to a base station, the base station instructs the terminal device to measure at least one of a CN type of a neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access, and thus the demand for ANR in the eLTE communications and the NR communications can be met.

Figure 6:
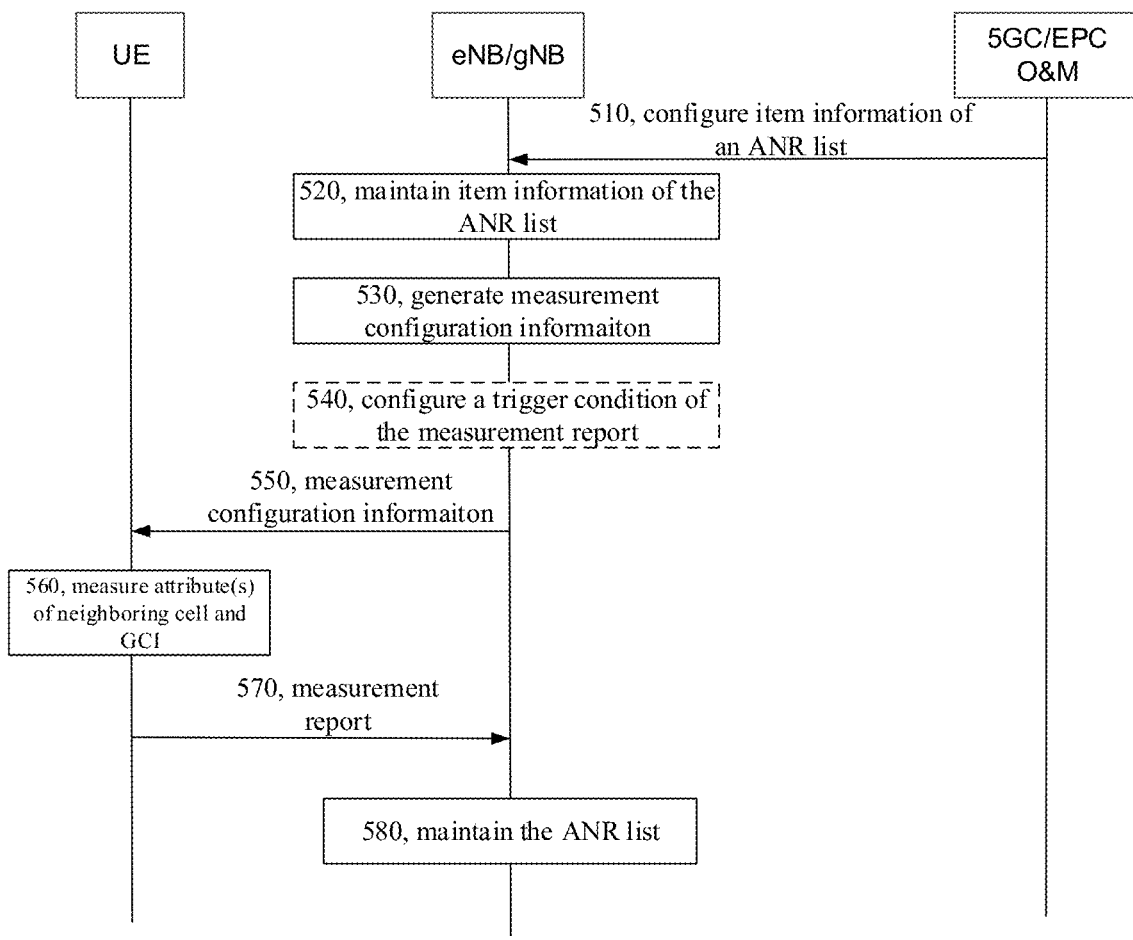
FIG. 6 is a schematic flowchart of a method for configuring an ANR according to an implementation of the present disclosure.

According to an implementation, as shown in FIG. 6, the ANR is configured by information interaction between a terminal device (for example, a UE), a base station (for example, an eNB/gNB), and a core network device (for example, O & M in 5GC/EPC).

In 510, the core network device configures item information of the ANR list.

According to exemplary implementations, the item information comprises at least one of CGI, a CN type of a neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access.

According to exemplary implementations, the ANR list is configured to indicate one or more attributes of the neighboring cell which are measured by the terminal device according to the item information.

In 520, the base station maintains item information in the ANR list.

According to exemplary implementations, the base station stores a blank ANR list (a table containing only item information) for the terminal device, or the base station generates a blank ANR list for the terminal device as needed.

According to exemplary implementations, the base station adds, modifies, and deletes the item information in the ANR list according to the item information of the ANR list configured by the core network device. For example, the base station may add new attribute information, such as adding a CN type, slice availability, supported service, specific SIB and Xn interface.

In 530, the base station generates measurement configuration information.

According to exemplary implementations, the measurement configuration information may include at least one of CGI, a CN type of the neighboring cell, a cell type of the neighboring cell, whether the neighboring cell supports a specific service (YES or NO), whether the neighboring cell has an available network slice, a specific SIB of the neighboring cell, whether the neighboring cell supports an Xn interface, whether the neighboring cell is a licensed frequency band and whether the neighboring cell supports standalone access.

According to exemplary implementations, in step 540, the base station configures a trigger condition of the measurement report.

According to exemplary implementations, if the trigger condition of the measurement report is met, the terminal device sends the measurement report. The terminal device does not need to send the measurement report until all the measurements results are obtained.

According to exemplary implementations, the base station configures a time for reporting the measurement report. For example, the base station may configure that the terminal device may send the measurement report after 10 ms of measurement.

It should be understood that the base station flexibly configures the time for reporting according to actual needs.

According to exemplary implementations, the base station may configure information for reporting the measurement report. For example, the base station may configure that after measuring the CGI, the CN type of the neighboring cell, and the cell type of the neighboring cell, the measurement report can be sent.

It should be understood that the base station flexibly configures which information is reported according to actual needs.

In 550, the base station sends measurement configuration information to the terminal device.

The measurement configuration information is configured to instruct the terminal device to measure one or more attributes of a neighboring cell and a Global Cellular Identifier.

According to exemplary implementations, one or more attributes of the neighboring cell may be the following cases:

Case 1: the one or more attributes of the neighboring cell comprise at least one of a CN type of the neighboring cell, a cell type of the neighboring cell, whether the neighboring cell supports a specific service, whether the neighboring cell has an available network slice, a specific SIB of the neighboring cell, and whether the neighboring cell supports an Xn interface.

Case 2: the one or more attributes of the neighboring cell comprise at least one of whether the neighboring cell is a licensed frequency band and whether the neighboring cell supports standalone access.

Case 3: the one or more attributes of the neighboring cell comprise at least one of a CN type of the neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access.

In 560, the terminal device measures neighboring cell information according to information that needs to be measured as configured by the base station.

According to exemplary implementations, the neighboring cell is at least one of a cell supporting LTE communication, a cell supporting ELTE communication, and a cell supporting NR communication.

According to exemplary implementations, the terminal device may determine the CN type of the neighboring cell according to a correspondence between CN types and at least one of TACs and CGIs, and at least one of a TAC and a CGI of the neighboring cell.

It should be noted that one base station may broadcast at least one TAC and CGI. If different core networks are connected, the base station can broadcast the TAC and CGI with the same or different formats for different core network types.

In 570, the terminal device sends the measurement report.

According to exemplary implementations, if there is no step 540, the terminal device sends the measurement results in the measurement report when all the information that needs to be measured as configured by the base station is measured.

According to exemplary implementations, if there is a step 540, the terminal device reports the measurement results in the measurement report when the trigger condition is met.

According to exemplary implementations, if the one or more attributes of the neighboring cell comprise at least the CN type of the neighboring cell, receiving a measurement report which is sent by the terminal device in response to the measurement configuration information comprises:

receiving the measurement report sent from the terminal device, wherein the measurement report comprises at least at least one of a TAC and a CGI of the neighboring cell and does not comprise the CN type of the neighboring cell, and at least one of the TAC and the CGI of the neighboring cell implicitly indicates the CN type of the neighboring cell.

According to exemplary implementations, if the base station configures that the terminal device reports the measurement results in the first duration, the terminal device sends the first indication information to the base station. The first indication information is used to among the neighboring cell information that needs to be measured as configured by the base station, neighboring cell information that is not obtained within the first duration.

According to exemplary implementations, if the base station configures that the terminal device reports the measurement results in the first duration, the terminal device sends the second indication information to the base station. The second indication information is configured to notify the base station that in item information of an ANR list, the neighboring cell information which is not measured by the terminal device within the first duration is left blank.

In 580, the base station maintains the ANR list.

According to exemplary implementations, the base station adds the information included in the measurement report sent by the terminal device to the blank ANR list for the terminal device.

For example, Table 1 is shown below.

| CGI of neighboring cell | CN type of neighboring cell | whether there is Xn for neighboring cell | PCI of neighboring cell | whether neighboring cell has available network slice | whether neighboring cell supports a specific service like V2X |
|---|---|---|---|---|---|
| CGI1 | 5GC only | YES | 16 | YES | YES |
| CGI2 | EPC and 5GC | NO | 22 | NO | NO |

According to exemplary implementations, Table 1 may further include some other attributes, for example, whether the neighboring cell is a licensed frequency band, whether the neighboring cell supports standalone access, and the like.

It should be understood that the contents in Table 1 above are exemplary newly extended attributes of the ANR table in the implementations of the present disclosure. In actual, the ANR list attributes also include some attributes that need to be measured in LTE, for example, a terminal control interface (TCI).

In the method for configuring an ANR according to implementations of the present disclosure, the core network device sends item information of an ANR list to a base station, the base station instructs the terminal device to measure at least one of a CN type of a neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access, and thus the demand for ANR in the eLTE communications and the NR communications can be met.

Figure 7:
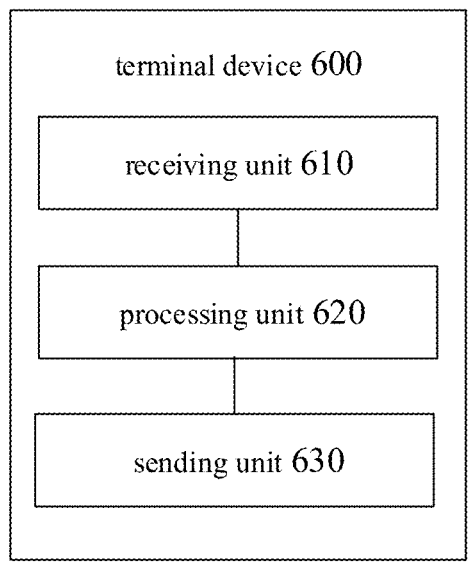
FIG. 7 is a schematic block diagram of a terminal device according to an implementation of the present disclosure.

FIG. 7 is a schematic block diagram of a terminal device 600 according to an implementation of the present disclosure. As shown in FIG. 7, the terminal device 600 includes a receiving unit 610, a processing unit 620 and a sending unit 630.

The receiving unit 610 is configured to receive measurement configuration information sent from a base station.

The processing unit 620 is configured to, according to the measurement configuration information, measure one or more attributes of a neighboring cell and a Cell Global Identifier (CGI).

The sending unit 630 is configured to send a measurement report to the base station. The measurement report is configured to indicate the one or more attributes of the neighboring cell and the GCI.

According to exemplary implementations, the one or more attributes of the neighboring cell comprise at least one of a CN type of the neighboring cell, a cell type of the neighboring cell, whether the neighboring cell supports a specific service, whether the neighboring cell has an available network slice, a specific SIB of the neighboring cell, and whether the neighboring cell supports an Xn interface.

According to exemplary implementations, if the one or more attributes of the neighboring cell comprise at least the CN type of the neighboring cell, the processing unit is further configured to:

determine the CN type of the neighboring cell according to a correspondence between CN types and at least one of TACs and/or CGIs, and at least one of a TAC and a CGI of the neighboring cell;

the sending unit 630 is configured to:

sending the measurement report to the base station, wherein the measurement report comprises at least at least one of the TAC and the CGI of the neighboring cell and does not comprise the CN type of the neighboring cell, and at least one of the TAC and the CGI of the neighboring cell implicitly indicates the CN type of the neighboring cell.

According to exemplary implementations, the correspondence between CN types and at least one of TACs and CGIs is preset, and at least one of TAC and CGI formats corresponding to different CN types are different.

According to exemplary implementations, the one or more attributes of the neighboring cell comprise at least one of whether the neighboring cell is a licensed frequency band and whether the neighboring cell supports standalone access.

According to exemplary implementations, the measurement configuration information comprises a first duration;

the sending unit 630 is further configured to:

send to the base station a first measurement report, wherein the first measurement report is configured to indicate an attribute among the one or more attributes of the neighboring cell which is measured within the first duration.

According to exemplary implementations, the sending unit 630 is further configured to:

send to the base station first indication information, wherein the first indication information is configured to indicate an attribute among the one or more attributes of the neighboring cell which is not measured within the first duration.

According to exemplary implementations, the sending unit 630 is further configured to:

send to the base station second indication information, wherein the second indication information is configured to notify the base station that in item information of an ANR list, the attribute among the one or more attributes of the neighboring cell which is not measured by a terminal device within the first duration is left blank; wherein the item information comprises the one or more attributes of the neighboring cell and the CGI.

According to exemplary implementations, the neighboring cell is at least one of a cell supporting Long Term Evolution (LTE) communication, a cell supporting evolved Long Term Evolution (eLTE) communication, and a cell supporting New Radio (NR) communication.

It should be understood that the terminal device 600 according to the implementations of the present disclosure may correspond to the terminal device in the method 200 according to the implementations of the present disclosure, and the foregoing and other operations and/or functions of respective units in the terminal device 600 are used to implement corresponding processes of the terminal device in the method 200 described with reference to FIG. 3. For brevity, repeated descriptions are omitted herein.

Figure 8:
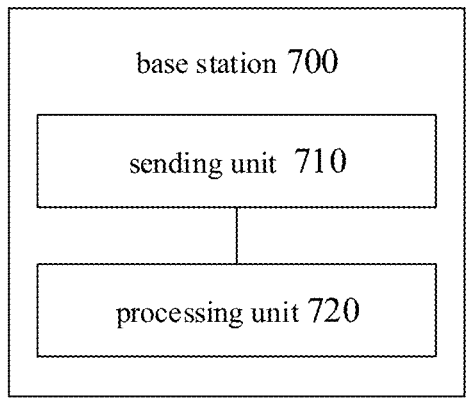
FIG. 8 is a schematic block diagram of a base station according to an implementation of the present disclosure.

FIG. 8 is a schematic block diagram of a base station 700 according to an implementation of the present disclosure. As shown in FIG. 8, the base station 700 includes a sending unit 710 and a receiving unit 720.

The sending unit 710 is configured to send measurement configuration information to a terminal device. The measurement configuration information is configured to instruct the terminal device to measure one or more attributes of a neighboring cell and a Cell Global Identifier (GCI).

The receiving unit 720 is configured to receive a measurement report which is sent by the terminal device in response to the measurement configuration information.

According to exemplary implementations, the one or more attributes of the neighboring cell comprise at least one of a CN type of the neighboring cell, a cell type of the neighboring cell, whether the neighboring cell supports a specific service, whether the neighboring cell has an available network slice, a specific SIB of the neighboring cell, and whether the neighboring cell supports an Xn interface.

According to exemplary implementations, if the one or more attributes of the neighboring cell comprise at least the CN type of the neighboring cell, the receiving unit 720 is configured to:

receive the measurement report sent from the terminal device, wherein the measurement report comprises at least at least one of a TAC and a CGI of the neighboring cell and does not comprise the CN type of the neighboring cell, and at least one of the TAC and the CGI of the neighboring cell implicitly indicates the CN type of the neighboring cell.

According to exemplary implementations, the one or more attributes of the neighboring cell comprise at least one of whether the neighboring cell is a licensed frequency band and whether the neighboring cell supports standalone access.

According to exemplary implementations, the measurement configuration information comprises a first duration;

the receiving unit 720 is configured to:

receive a first measurement report sent from the terminal device, wherein the first measurement report is configured to indicate an attribute among the one or more attributes of the neighboring cell which is measured by the terminal device within the first duration.

According to exemplary implementations, the receiving unit 720 is further configured to:

receive first indication information sent from the terminal device, wherein the first indication information is configured to indicate an attribute among the one or more attributes of the neighboring cell which is not measured by the terminal device within the first duration.

According to exemplary implementations, the receiving unit 720 is further configured to:

receive second indication information sent from the terminal device, wherein the second indication information is configured to notify the base station that in item information of an ANR list, the attribute among the one or more attributes of the neighboring cell which is not measured by the terminal device within the first duration is left blank; wherein the item information comprises the one or more attributes of the neighboring cell and the CGI.

According to exemplary implementations, the base station further includes a processing unit 730.

The processing unit 730 is configured to determine an ANR list according to the measurement report sent from the terminal device, wherein the ANR list comprises the one or more attributes of the neighboring cell which are measured by the terminal device and are carried in the measurement report.

According to exemplary implementations, the receiving unit 720 is configured to, before the sending unit 710 sends the measurement configuration information, receive item information sent from a core network device, wherein the item information comprises the one or more attributes of the neighboring cell and the CGI; and the base station further comprises a processing unit 730 configured to, according to the item information, generate an ANR list comprising the item information.

According to exemplary implementations, the processing unit 730 is further configured to:

generate the measurement configuration information according to the item information.

According to exemplary implementations, the neighboring cell is at least one of a cell supporting Long Term Evolution (LTE) communication, a cell supporting evolved Long Term Evolution (eLTE) communication, and a cell supporting New Radio (NR) communication.

It should be understood that the base station 700 according to the implementations of the present disclosure may correspond to the base station in the method 300 according to the implementations of the present disclosure, and the foregoing and other operations and/or functions of respective units in the base station 700 are used to implement corresponding processes of the base station in the method 300 described with reference to FIG. 4. For brevity, repeated descriptions are omitted herein.

Figure 9:
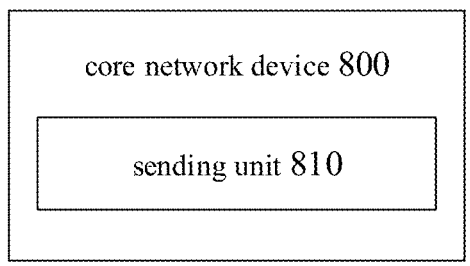
FIG. 9 is a schematic block diagram of a core network device according to an implementation of the present disclosure.

FIG. 9 is a schematic block diagram of a core network device 800 according to an implementation of the present disclosure. As shown in FIG. 9, the core network device 800 includes a sending unit 810.

The sending unit 810 is configured to send item information of an ANR list to a base station. The item information comprises at least one of a Cell Global Identifier (CGI), a CN type of a neighboring cell, a cell type of the neighboring cell, whether the neighboring cell supports a specific service, whether the neighboring cell has an available network slice, a specific SIB of the neighboring cell, whether the neighboring cell supports an Xn interface, whether the neighboring cell is a licensed frequency band and whether the neighboring cell supports standalone access. The ANR list is configured to indicate one or more attributes of the neighboring cell which are measured by the terminal device according to the item information.

It should be understood that the core network device 800 according to the implementations of the present disclosure may correspond to the core network device in the method 400 according to the implementations of the present disclosure, and the foregoing and other operations and/or functions of respective units in the core network device 800 are used to implement corresponding processes of the core network device in the method 400 described with reference to FIG. 5. For brevity, repeated descriptions are omitted herein.

Figure 10:
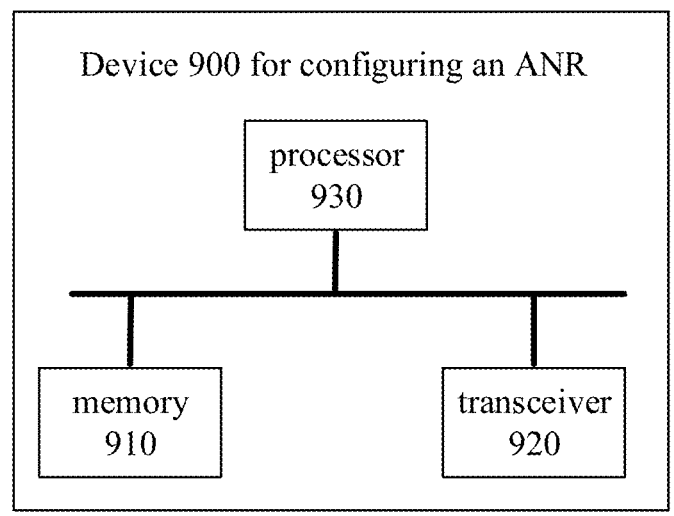
FIG. 10 is a schematic block diagram of a device for configuring an ANR according to an implementation of the present disclosure.

FIG. 10 is a schematic block diagram of a device 900 for configuring an ANR according to an implementation of the present disclosure. The device 900 includes a memory 910, a transceiver 920 and a processor 930.

The memory 910 is configured to store programs, and the programs include codes.

The transceiver 920 is configured to communicate with other devices.

The processor 930 is configured to execute program codes in the memory 910.

According to exemplary implementations, when the codes are executed, the processor 930 can implement various operations performed by the terminal device in the method 200 described with reference to FIG. 3. For brevity, details are not repeated again. Under such condition, the device 900 may be a terminal device (for example, a mobile phone). The transceiver 920 is configured to perform signal transceiving under the driving of the processor 930.

According to exemplary implementations, when the codes are executed, the processor 930 can implement various operations performed by the base station in the method 300 described with reference to FIG. 4. For brevity, details are not repeated again. Under such condition, the device 900 may be a base station (for example, an access network device).

According to exemplary implementations, when the codes are executed, the processor 930 can implement various operations performed by the core network in the method 400 described with reference to FIG. 5. For brevity, details are not repeated again. Under such condition, the device 900 may be a core network device (for example, 5GC, or EPC).

It should be understood that, in the implementations of the present disclosure, the processor 930 may be a Central Processing Unit (CPU), and the processor 930 may also be other general-purpose processors, Digital Signal Processor (DSP), Application Specific Integrated Circuit (ASIC), Field Programmable Gate Array (FPGA) or other programmable logic device, discrete gate or transistor logic device, discrete hardware component, and so on. The general purpose processor may be a microprocessor or the processor may be any conventional processor or the like.

The memory 910 can include read only memory and random access memory and provides instructions and data to the processor 930. A portion of the memory 910 may also include a non-volatile random access memory. For example, the memory 910 can also store information of the device type.

The transceiver 920 can be used to implement signal transmission and reception, such as frequency modulation and demodulation functions or up-conversion and down-conversion functions.

During implementation, at least one step of the foregoing method implementations can be completed by an integrated hardware logic circuit in the processor 930, or the at least one step can be completed by the integrated hardware logic circuit driven under software instructions. The device 900 for configuring an ANR may be a chip or a chip group. The steps of the methods disclosed in the implementations of the present disclosure can be directly completed by a hardware processor, or by a combination of hardware and software modules in the processor. The software modules can be located in a storage medium that is well-known in the art such as a random access memory, a flash memory, a read only memory, a programmable read only memory or an electrically erasable programmable memory, a register. The storage medium is located in the memory and the processor 930 reads information in the memory and completes the steps of the above-described methods with its hardware. For brevity, details are not provided here.

Figure 11:
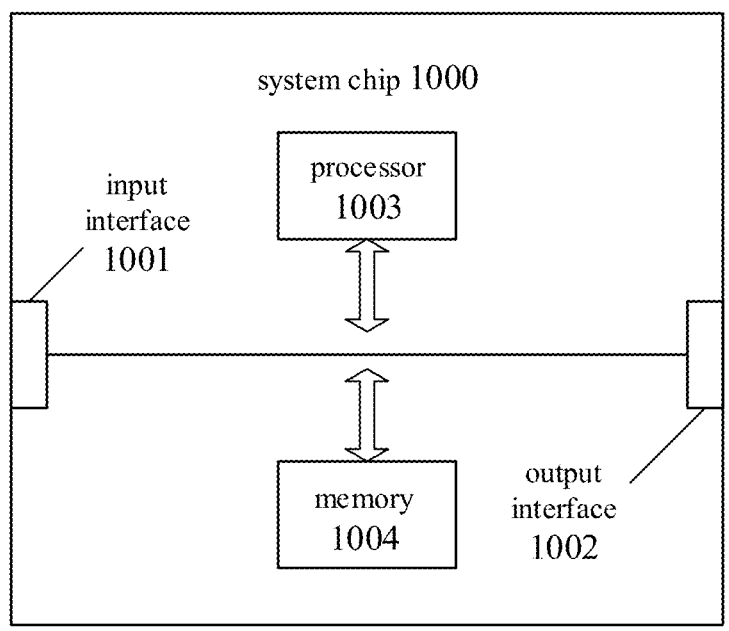
FIG. 11 is a schematic structural diagram of a system chip according to an implementation of the present disclosure.

FIG. 11 is a schematic structural diagram of a system chip 1000 according to an implementation of the present disclosure. The system chip 1000 in FIG. 11 includes an input interface 1001, an output interface 1002, a processor 1003, and a memory 1004. The input interface 1001, the output interface 1002, the processor 1003, and the memory 1004 may be connected by an internal communication connection line, and the processor 1003 is configured to execute the codes in the memory 1004.

According to exemplary implementations, when the codes are executed, the processor 1003 implements the methods performed by the terminal device in the method implementations. For brevity, repeated descriptions are omitted here.

According to exemplary implementations, when the codes are executed, the processor 1003 implements the methods performed by the network device in the method implementations. For brevity, repeated descriptions are omitted here.

Those of ordinary skill in the art will appreciate that the exemplary units and algorithm steps described according to the implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for configuring an automatic neighbor relationship (ANR), comprising:
receiving measurement configuration information sent from a base station;
measuring one or more attributes of a neighboring cell and a Cell Global Identifier (CGI) of the neighboring cell, according to the measurement configuration information; and
sending a measurement report to the base station, wherein the measurement report is used for indicating the one or more attributes of the neighboring cell and the CGI, and the one or more attributes are used to determine, at the base station, an ANR list;
wherein the one or more attributes of the neighboring cell comprise at least one of a Core Network (CN) type of the neighboring cell, a cell type of the neighboring cell, whether the neighboring cell supports a specific service, and whether the neighboring cell has an available network slice;
wherein the cell type of the neighboring cell comprises a cell supporting LTE communication, a cell supporting eLTE communication, or a cell supporting New Radio (NR) communication;
wherein if the one or more attributes of the neighboring cell comprise at least the CN type of the neighboring cell, the method further comprises:
determining the CN type of the neighboring cell according to a correspondence between CN types and at least one of Tracking Area Codes (TACs) and Cell Global Identifiers (CGIs), and at least one of a TAC and a CGI of the neighboring cell;
wherein sending the measurement report to the base station, comprises:
sending the measurement report to the base station, wherein the measurement report comprises at least at least one of the TAC and the CGI of the neighboring cell and does not comprise the CN type of the neighboring cell, and at least one of the TAC and the CGI of the neighboring cell implicitly indicates the CN type of the neighboring cell.

2. The method according to claim 1, wherein the specific service supported by the neighboring cell comprises at least one of a Vehicle to Everything (V2X) service or a Device to Device (D2D) service.

3. The method according to claim 1, wherein the CN type comprises at least one of an Evolved Packet Core (EPC) type or a 5G Core (5GC) type.

4. The method according to claim 1, wherein the correspondence between CN types and at least one of TACs and CGIs is preset, and at least one of TAC and CGI formats corresponding to different CN types are different.

5. The method according to claim 4, wherein:
the TAC format corresponding to a 5GC type needs more bits than the TAC format corresponding to an EPC type; or
the CGI format corresponding to the 5GC type needs more bits than the CGI format corresponding to the EPC type.

6. The method according to claim 1, wherein the one or more attributes of the neighboring cell comprise at least one of whether the neighboring cell is a licensed frequency band and whether the neighboring cell supports standalone access.

7. The method according to claim 1, wherein the measurement configuration information comprises a first duration;
wherein sending the measurement report to the base station, comprises:
sending to the base station a first measurement report, wherein the first measurement report is configured to indicate an attribute among the one or more attributes of the neighboring cell which is measured within the first duration.

8. The method according to claim 7, further comprising:
sending to the base station first indication information, wherein the first indication information is configured to indicate an attribute among the one or more attributes of the neighboring cell which is not measured within the first duration.

9. The method according to claim 1, wherein the base station is an Evolved Node B or a base station in fifth generation communication.

10. A method for configuring an automatic neighbor relationship (ANR), comprising:
sending measurement configuration information to a terminal device, wherein the measurement configuration information is configured to instruct the terminal device to measure one or more attributes of a neighboring cell and a Cell Global Identifier (CGI); and
receiving a measurement report which is sent by the terminal device in response to the measurement configuration information, wherein the measurement report is used for indicating the one or more attributes of the neighboring cell and the CGI, and the one or more attributes are used to determine, at a base station, an ANR list;
wherein the one or more attributes of the neighboring cell comprise at least one of a Core Network (CN) type of the neighboring cell, a cell type of the neighboring cell, whether the neighboring cell supports a specific service, and whether the neighboring cell has an available network slice;
wherein the cell type of the neighboring cell comprises a cell supporting LTE communication, a cell supporting eLTE communication, or a cell supporting New Radio (NR) communication;
wherein if the one or more attributes of the neighboring cell comprise at least the CN type of the neighboring cell, receiving a measurement report which is sent by the terminal device in response to the measurement configuration information comprises:
receiving the measurement report sent from the terminal device, wherein the measurement report comprises at least at least one of a Tracking Area Code (TAC) and a Cell Global Identifier (CGI) of the neighboring cell and does not comprise the CN type of the neighboring cell, and at least one of the TAC and the CGI of the neighboring cell implicitly indicates the CN type of the neighboring cell.

11. A terminal device, comprising:
a memory storing programs;
a transceiver; and
a processor configured to execute the programs;
wherein:
the transceiver is configured to receive measurement configuration information sent from a base station;
the processor is configured to, according to the measurement configuration information, measure one or more attributes of a neighboring cell and a Cell Global Identifier (CGI); and the transceiver is further configured to send a measurement report to the base station, wherein the measurement report is configured to indicate the one or more attributes of the neighboring cell and the CGI, and the one or more attributes are used to determine, at the base station, an ANR list;

wherein the one or more attributes of the neighboring cell comprise at least one of a Core Network (CN) type of the neighboring cell, a cell type of the neighboring cell, whether the neighboring cell supports a specific service, and whether the neighboring cell has an available network slice;

wherein the cell type of the neighboring cell comprises a cell supporting LTE communication, a cell supporting eLTE communication, or a cell supporting New Radio (NR) communication;

wherein if the one or more attributes of the neighboring cell comprise at least the CN type of the neighboring cell, the processor is further configured to:
  determine the CN type of the neighboring cell according to a correspondence between CN types and at least one of Tracking Area Codes (TACs) and Cell Global Identifiers (CGIs), and at least one of a TAC and a CGI of the neighboring cell;

wherein the transceiver is configured to:
  send the measurement report to the base station, wherein the measurement report comprises at least at least one of the TAC and the CGI of the neighboring cell and does not comprise the CN type of the neighboring cell, and at least one of the TAC and the CGI of the neighboring cell implicitly indicates the CN type of the neighboring cell.

12. The terminal device according to claim 11, wherein the specific service supported by the neighboring cell comprises at least one of a Vehicle to Everything (V2X) service or a Device to Device (D2D) service.

13. The terminal device according to claim 11, wherein the CN type comprises at least one of an Evolved Packet Core (EPC) type or a 5G Core (5GC) type.

14. The terminal device according to claim 11, wherein the correspondence between CN types and at least one of TACs and CGIs is preset, and at least one of TAC and CGI formats corresponding to different CN types are different.

15. The terminal device according to claim 14, wherein:
  the TAC format corresponding to a 5GC type needs more bits than the TAC format corresponding to an EPC type; or
  the CGI format corresponding to the 5GC type needs more bits than the CGI format corresponding to the EPC type.

16. The terminal device according to claim 11, wherein the one or more attributes of the neighboring cell comprise at least one of whether the neighboring cell is a licensed frequency band and whether the neighboring cell supports standalone access.

* * * * *